Sept. 30, 1969   W. BRONNVALL ET AL   3,470,045
METHOD OF MANUFACTURING AN INSULATED ELECTRICAL CONDUCTOR
Filed June 3, 1965

INVENTORS
Wolfgang Bronnvall
Jostein Andreassen
BY
Bailey, Stephens & Huettig,
Attorneys United States Patent Office 3,470,045
Patented Sept. 30, 1969

3,470,045
METHOD OF MANUFACTURING AN INSULATED ELECTRICAL CONDUCTOR
Wolfgang Bronnvall and Jostein Andreassen, Vasteras, Sweden, assignors to Allmänna Svenska Elektriska Aktiebolaget, Vasteras, Sweden, a corporation of Sweden
Filed June 3, 1965, Ser. No. 460,892
Int. Cl. H01b 13/08; B32b 5/16
U.S. Cl. 156—53    7 Claims

ABSTRACT OF THE DISCLOSURE

A method of manufacturing an insulated electric conductor, the insulation of which is constituted by a bandage of an insulating material wound around the conductor in several layers, the bandage being impregnated with a resin and the insulating material comprising a self-carrying layer of small mica flakes overlapping each other, a backing for the mica flake layer and a binder for binding the mica flake layer to the backing. In this method a binder is used, which is composed of a thermosetting high molecular alkyd resin built up of isophthalic or terephthalic acid or mixtures thereof.

---

Figure 1:
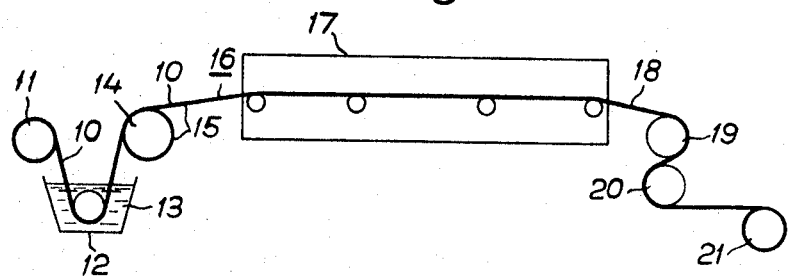

The present invention relates to a method of manufacturing an insulated electrical conductor, the insulation comprising a wrapping of several layers of an insulating material which comprises a layer of mica flakes, a backing layer for the mica flake layer and a binder which binds the mica flake layer to the backing.

There are great difficulties involved in effecting a corona-free, mechanically strong insulation for electrical conductors when using mica sheet or mica tape which is wound around the conductors in several layers. The problems arising will be dealt with more closely with reference to the following description of the manufacture of a group of products, namely high voltage coils, chosen by way of example.

The manufacture of high voltage coils is often carried out in such a way that bundles of conductors composed of individual conductors are wrapped in several layers with mica tape or mica sheet consisting of mica flakes attached to a tape or sheet formed backing of, for example, paper, silk or glass cloth, after which the wrapped bundles are subjected to further treatment usually consisting of an impregnation with an impregnant and a subsequent moulding of the insulation. Before the impregnation moisture and other volatile constituents are usually removed as far as possible by vacuum treatment. The purpose of the impregnation is to fill voids and air spaces occurring in the insulation, so as to give the insulation good electrical and mechanical properties. To ensure that the filling is good the impregnation is often carried out by means of a vacuum-pressure process and by using asphalt or a liquid solventless synthetic resin as the impregnant.

Incomplete filling causes corona, i.e. internal electrical discharges, to occur in the remaining voids in the insulation when it is subjected to electrical stresses. These discharges destroy the insulating material, and as a result the insulation as well, at stresses which are substantially lower than those which the insulation could withstand if no voids existed. Punctures and other electrical faults thus occur after a considerably shorter time and at lower stresses in an incompletely filled insulation than in a completely filled one.

One factor which is of the greatest importance when insulating coils in the manner described above is that the insulating tapes are easily applied on the conductors and that they have themselves good mechanical strength and flexibility so that they can be wound on under tension to form tightly wound insulations.

As binder for the described tapes shellac, asphalt or synthetic resins have been used for a long time. The binder is applied on the mica flakes or backing dissolved in a solvent. Binders used so far have had the capacity to penetrate in between the mica flakes in the mica flake layer. When the mica and backing have been joined the insulating material is usually subjected to a heat treatment to remove as much as possible of the solvent. At the removal of the solvent it leaves small holes in the mica flake layer which because of the remaining binder cannot be completely filled by the impregnant applied later. Such tapes with shellac and synthetic resins which are insoluble in the impregnant, are stiff and it is thus difficult to effect tight coils with them. Since it has been found that said insoluble binders in the mica tape during impregnation of the insulations make penetration of the impregnant considerably more difficult, several ways have been tried of avoiding their use and using other types of binders.

Thus it has been proposed that an easily volatile binder should be used in the tapes which, when the tapes have been wound on, volatilizes before the insulation is impregnated. However, this use of an easily volatile binder in the tapes means that the manufacture of the insulation becomes complicated and expensive due to the procedure required for the removal of the binder and further, because the binder is volatile, special precautions must be taken when storing the tapes.

Mica tapes are also known consisting of a backing, for example glass cloth, and mica flakes glued or sewn on to this pointwise. Such mica tapes contain no binder or practically none, to hinder penetration of the impregnant. A glueing of the mica to the backing at spaced points, however, gives unsatisfactory adhesion so that when the tape is wound on to a conductor the mica flakes easily loosen from the backing and if the mica flakes are mechanically sewn on an electrical and mechanical weakening of the mica results. Further, the tapes are difficult to handle since the mica flakes may easily be damaged by the parts lying outside the attachment points being broken off. Again, because of the attachment at spaced points, the tape is undesirably stiff.

Mica tapes are also known in which the binder chosen is soluble in the impregnant so that it only presents a temporary hindrance to the penetration of the impregnant. As such binders have been used liquid polymers such as arylalkene polymers, for example polystyrene, polymethyl methacrylate, liquid cumarone and indene polymers and further, inter alia, liquid alkyds manufactured from unsaturated dicarboxylic acids such as maleic and fumaric acids and glycols, possibly with at the same time the addition of saturated dicarboxylic acids such as adipic acid and sebacic acid. When these products are used as binder they are applied on the backing or on the mica flakes dissolved in a solvent. These binders, as is the case with the earlier mentioned binders, have the capacity to penetrate in between the mica flakes in the mica flake layer. When the mica and backing have been joined the insulating material is subjected to a heat treatment to remove as much as possible of the solvent. Because of the occurrence of the binder between the mica flakes, it is particularly difficult to completely remove the solvent there. If the remains of the solvent cannot be completely removed it may obstruct the penetration of the impregnant and give rise to spaces where corona can arise. After removal of the solvent from the binder there are small spaces left in the mica flake layer which, due to the remaining binder, may take time to fill since, despite its solubility in the impregnant, the binder presents a temporary obstacle for the penetration of the impregnant. Other disadvantages with these tapes are that due to the state of aggregation of the binder they may be sticky, difficult to handle and also show an unsatisfactory mechanical strength as a consequence of too weak binding between backing and mica flakes. Another disadvantage, which may be of considerable importance, is that due to their solubility they might unfavourably influence the properties of the impregnant. Therefore in each particular case the binder must be chosen according to the impregnant used. When different types of impregnants are used, therefore, tapes having different types of binder must be kept in stock. The impregnant is usually stored in a large bath where the coils are continuously impregnated and consumed resin successively replaced. This method used in practice may, therefore, after some time lead to an undesired alteration in the composition of the impregnant.

The present invention comprises a method of manufacturing an insulated tape which on the one hand does not have the disadvantages mentioned with the tapes described having a resinous binder where the binder penetrates into the mica layer or where the binder itself is stiff or produces an unsatisfactory adhesion between the mica and the backing, and on the other hand does not have the similarly mentioned disadvantages of the binder-free tapes consisting of difficulties in applying the tapes because of their construction and bad mechanical properties. The tape according to the invention contains no binder in the mica flake layer and is extremely flexible, mechanically strong and dry and therefore easy to apply on a conductor. According to the invention it is possible to manufacture a tape in which the binder is insoluble in any possible impregnant so that the binder does not have to be chosen according to the impregnant used.

The invention relates to a method of manufacturing an insulated electrical conductor, particularly a high voltage coil, the insulation comprising a bandage of an insulating material wound around the conductor in several layers, the bandage being impregnated with an impregnant, preferably a completely polymerisable resin, said insulating material comprising a self-carrying layer of small mica flakes overlapping each other, a backing layer for the mica flake layer and a binder which binds the mica flake layer to the backing. The invention is characterised in that the insulating material is manufactured by binding the mica flake layer to the backing with a binder comprising a thermosetting alkyd resin built up of isophthalic and/or terephthalic acid, the average molecule weight of which is so high when it is brought into contact with the mica flake layer that a 50% by weight solution of the alkyd resin in a mixture of 10 parts by weight toluene and 3 parts by weight n-butanol has a viscosity at 23° C. of at least 250 centipoise and which is preferably transformed to its cured state before the insulating material is applied around the conductor.

The mica flake layer consists of a known binder-free self-carrying tape or sheet or small mica flakes overlapping each other, manufactured according to known methods, for example by splitting ordinary mica, wherein the mica is first heated and then exposed alternately to the influence of two solutions one after the other which react with each other while developing gas, after which the thus split mica is mixed to a pulp with water and finally shaped to a sheet-shaped material according to a method similar to that used in the manufacture of paper.

The backing may consist of backing material normally used for mica flakes such as glass cloth, glass cloth tapes, tapes or cloths of other fibrous material such as asbestos, cotton, silk, and paper. Glass fibre products are particularly suitable partly because of their good mechanical properties and partly because of their good power of thermal resistance.

Because of the high molecule weight of the isophthalic or terephthalic acid alkyd, the alkyd cannot penetrate into pores occurring in the mica flake layer but remains on the surface. Thus the alkyd resin is no obstacle to the penetration of the impregnant into the mica layer and this may therefore be completely filled with the impregnant used. Besides the ability to produce alkyd resins having high molecule weight, isophthalic and terephthalic acids also have the capacity to give alkyd resins with good power of thermal resistance. In order to obtain tapes as strong and flexible as possible and to ensure that the binder does not have an unfavourable effect on the properties of the impregnant used, it is advantageous to cure the alkyd before the tape is applied around the conductor.

According to the invention the binder may with advantage comprise a reaction product of isophthalic and/or terephthalic acid or their lower alkyl esters, one or more dicarboxylic acids having at least six carbon atoms, one or more dihydric alcohols and one or more polyhydric alcohols containing at least three hydroxyl groups, whereby the ratio between the number of hydroxyl groups and the number of carboxylic groups in the starting mixture of alcohols and acids is at least 1.1 and at the most 1.7, preferably at least 1.2 and at the most 1.5. The ratio between the weight of on the one hand isophthalic and/or terephthalic acid either as such or as components in their lower alkyl esters and on the other hand the weight of the aliphatic dicarboxylic acid is at the most 5 and at the least 0.5.

By lower dialkyl esters of isophthalic and terephthalic acid is meant esters containing alkyl groups having 1 to 8 carbon atoms, particularly 1 to 4 carbon atoms such as dimethyl esters, diethyl esters, dipropyl esters and dibutyl esters.

Amongst usable aliphatic dicarboxylic acids may be mentioned in the first place adipic and sebacic acid and also azelaic acid and pimellic acid.

As examples of dihydric alcohols in the alkyd resin may be mentioned glycols such as ethylene glycol, propylene glycol and butylene glycol together with polyglycols such as diethylene glycol, triethylene glycol and dipropylene glycol.

The polyhydric alcohol may consist of, for example, glycerol, pentaerythritol, trimethylolpropane, trimethylolethane, sorbitol, mannitol, etc.

Figure 2:
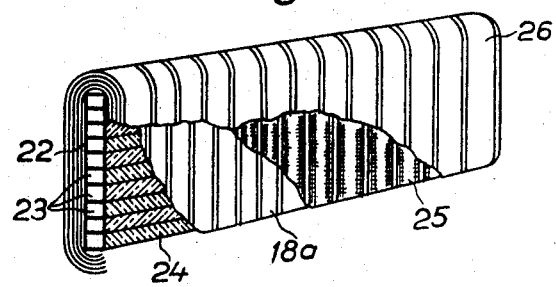

The invention will be further explained by describing a number of embodiments with reference to the accompanying drawing in which FIGURE 1 shows schematically an arrangement for manufacturing an insulated material according to the invention and FIGURE 2 an electric conductor manufactured according to the invention in which certain parts of the insulation have been removed so that the construction may be more clearly visible.

EXAMPLE 1

415 parts (5 equivalents) isophthalic acid, 190 parts (5 equivalents) propylene glycol and 157 parts (5.1 equivalents) glycerol are mixed and the temperature is increased first to 180° C. and thereafter by 10° C. per hour to 230° C. When the acid number has fallen to about 50 mg. KOH/g. the temperature is dropped to 180° C. and 146 parts (2 equivalents) adipic acid is added. The temperature is afterwards raised to 215° C. during 4 hours and maintained at this temperature until the acid number becomes 5. A test taken out and dissolved in 50% by weight solution in 10 parts toluene and 3 parts butanol then shows a viscosity of about 700 centipoise at 23° C. The reaction takes place the whole time in an atmosphere of nitrogen gas. By parts is here and in the following meant parts by weight. The alkyd may also be manufactured by mixing all the components together at the start. The temperature is then increased first to 160° C. and by 10° per hour to 220° C. which is maintained until the desired viscosity has been attained. Also when manufacturing the alkyd resins described in Examples 2–7 the aliphatic acids may either be added when the isophthalic acid has reacted with the alcohols to an acid number of about 50 or all the components may be mixed from the start. When determining the viscosity of the alkyd in the following exemplified cases the above-mentioned toluene-butanol mixture is used and the determination carried out at 23° C.

The isophthalic acid alkyd resin manufactured according to the above is dissolved in toluene/butanol in the ratio 10:3 to a 25% by weight solution, after which it used as binder in the manufacture of a mica tape in accordance with FIGURE 1.

A glass cloth 10 having a thickness of, for example, 0.12 mm. is brought from a storing roll 11 down into the bath 12 containing the dissolved isophthalic acid alkyd resin 13 and then continues onwards. A mica foil 15 having a thickness of, for example 0.06 mm. is carried to this from a storing roll 14. The combined product 16 thus formed runs with a speed of 1–2 m./min. into a furnace 17.7 m. long and having a temperature of 130–170° C., so that the solvent is effectively driven off and the alkyd cured. A tape 18 is thus obtained having an effective adhesion between glass cloth and mica foil. After passage of the driving rollers 19 and 20 the tape is wound on to the reel 21. Due to the high molecule weight of the alkyd resin, the mica foil remains unimpregnated. The tape is then cut up into narrower insulated tapes 18a, for example 25 mm. wide.

In accordance with FIGURE 2 the insulated tape 18a may be used for insulating a bundle of conductors 22 comprising part of a high voltage coil. In the case exemplified the coil 22 consists of several individual conductors 23. The number of conductors might for example be 10 and the cross section of each 2.5 x 10 mm. The conductors 23 are insulated from each other by being wound around with glass yarn 24 and impregnated with a binder, for example an epoxy resin, an alkyd resin, a phenolic resin or the like. Insulation of the conductor bundle 22 is effected by winding on to it the above described insulated tape 18a for example with half overlap. When the whole bundle has been provided with an insulation consisting of, for example, thirty layers of insulated tape situated one above the other, and further with a protective wrapping of glass fibre 25 wound on without overlap, the winding is first dried at a pressure of lower than 1 mm. Hg and at a temperature of 40° C., after which the impregnant is supplied at the said pressure. When the impregnant has been supplied, the pressure is increased to, for example 10 kp./cm.$^2$. The impregnant may, for example, be composed of an ester resin manufactured from adipic acid (11 mol percent), phthalic acid anhydride (11 mol percent), maleic acid anhydride (23 mol percent) and ethylene glycol (55 mol percent), and to which is added partly diallylphthalate in such a quantity that the diallylphthalate comprises 40% by weight of the combined quantity of polyester resin and diallylphthalate, and partly benzoyl peroxide in a quantity corresponding to 1% of the weight of the mixture. The polyester resin itself is produced by the reaction of a mixture of the above-mentioned acids and the alcohol in inert atmosphere by increasing the temperature to 220° C. and maintaining this temperature until the acid number of the reaction product is about 30. So that the impregnant shall not leak out of the insulation during the subsequent curing, the impregnated conductor bundle with its insulation may be covered with a wrapping of a sealing tape 26 of Teflon, nylon, or the like. The bundle of conductors may be placed in a moulding tool to cure the impregnant. When using the mentioned polyester resin curing may take place at a temperature of 130° C. for 1 hour.

EXAMPLE 2

Instead of the isophthalic acid alkyd resin used as binder in Example 1, an alkyd resin manufactured under the same conditions and dissolved in the same way is used, consisting of a reaction product or 415 parts (5 equ.) isophthalic acid, 224 parts (5 equ.) butylenglycol, 229 parts (5.1 equ.) trimethylolpropane and 146 parts (2 equ.) adipic acid. The components are reacted to a final acid number of 11, whereby the viscosity for a 50% by weight solution in toluene/butanol is about 1000 centipoise. The insulation of the conductor bundle may be carried out in the method described in Example 1.

EXAMPLE 3

Instead of the isophthalic acid alkyd resin used as binder in Example 1, an alkyd resin manufactured under the same conditions and dissolved in the same way is used, consisting of a reaction product of 332 parts (4 equ.) isophthalic acid, 228 parts (6 equ.) propylene glycol, 62 parts (2 equ.) glycerol, 68 parts (2 equ.) pentaerythritol and 303 parts (3 equ.) sebacic acid. The components are reacted to a final acid number of 8, whereby the viscosity of a 50% solution in toluene/butanol is about 450 centipoise. The insulation of the conductor bundle may be carried out in the manner described in Example 1.

EXAMPLE 4

Instead of the isophthalic acid alkyd resin used as binder in Example 1, an alkyd resin manufactured under the same conditions and dissolved in the same way is used, consisting of a reaction product of 249 parts (3 equ.) isophthalic acid, 190 parts (5 equ.) propylene glycol, 92 parts (3 equ.) glycerol and 292 parts (4 equ.) adipic acid. The components are reacted to a final acid number of 12, whereby the viscosity for a 50% by weight solution in toluene/butanol is about 1300 centipoise. The insulation of the conductor bundle may be carried out by the method described in Example 1.

EXAMPLE 5

Instead of the alkyd resin used as binder in Example 1, an alkyd resin manufactured under the same conditions and dissolved in the same way is used, consisting of a reaction product of 332 parts (4 equ.) isophthalic acid, 209 parts (5.5 equ.) propylene glycol, 123 parts (4 equ.) glycerol and 219 parts (3 equ.) adipic acid. The components are reacted to a final acid number of 1, whereby the viscosity of a 50% by weight solution in toluene/butanol is about 500 centipoise. The insulation of the conductor bundle may be carried out in the manner described in Example 1.

EXAMPLE 6

Instead of the isophthalic acid alkyd resin used as binder in Example 1, an alkyd resin manufactured under the same conditions and dissolved in the same way is used, consisting of a reaction product of 415 parts (5 equ.) isophthalic acid, 137 parts (4.4 equ.) ethylene glycol, 138 parts (4.5 equ.) glycerol and 146 parts (2 equ.) adipic acid. The components are reacted to a final acid number of 14, whereby the viscosity of a 50% by weight solution in toluene/butanol is 625 centipoise. The insulation of the conductor bundle may be carried out in the manner indicated in Example 1.

EXAMPLE 7

Instead of the isophthalic acid alkyd resin used as binder in Example 1, an alkyd resin manufactured under the same conditions and dissolved in the same way is used, consisting of a reaction product of 332 parts (4 equ.) isophthalic acid, 190 parts (5 equ.) propylene glycol, 157 parts (5.1 equ.) glycerol, 73 parts (1 equ.) adipic acid and 202 parts (2 equ.) sebacic acid. The components are reacted to a final acid number of 6, whereby the viscosity of a 50% by weight solution in toluene/butanol is about 600 centipoise. The insulation of the conductor bundle may be carried out in the manner described in Example 1.

EXAMPLE 8

A terephthalic acid alkyd resin is manufactured in the following way. 388 parts (4 equ.) dimethyl terephthalate, 209 parts (5.5 equ.) propylene glycol and 123 parts (equ.) glycerol are mixed and the temperature is increased first to 180° C. and afterwards by 10° C. per hour to 230° C. When ¾ of the theoretical quantity of methanol has evaporated 219 parts (3 equ.) adipic acid are added. The temperature is then increased to 215° C. over 4 hours and maintained at this temperature until the acid number has become 2, whereby the viscosity in 50% by weight toluene/butanol solution is about 450 centipoise. The reaction takes place the whole time in an atmosphere of nitrogen gas.

The terephthalic acid alkyd is dissolved in a solvent in the manner described in Example 1, and then used in the manufacture of a mica tape 18a as indicated there, after which the conductor bundle is insulated, similarly in the manner described in Example 1.

EXAMPLE 9

An alkyd resin based on both iso- and terephthalic acid is manufactured in the following way. 194 parts (2 equ.) dimethyl terephthalate, 209 parts (5.5 equ.) propylene glycol and 123 parts (4 equ.) glycerol are mixed and the temperature increased first to 180° C. and thereafter by 10° C. per hour to 210° C. and reacted until ¾ of the theoretical quantity of methanol has evaporated, when the reaction mixture is cooled to 180° C. and 219 parts (3 equ.) adipic acid and 166 parts (2 equ.) isophthalic acid added. The temperature is then increased to 215° C. over 4 hours and maintained at this temperature until the acid number has become 2, whereby the viscosity in 50% by weight toluene/butanol solution is about 600 centipoise. The reaction takes place the whole time in an atmosphere of nitrogen gas.

The alkyd obtained is dissolved in solvent as indicated in Example 1 and then used in the manufacture of a mica tape 18a as indicated there, after which a bundle of conductors is insulated, similarly as described in Example 1.

Instead of isophthalic acid it is possible in the cases illustrated in Examples 1–7 to use a dialkyl ester of isophthalic acid, for example dimethyl isophthalate, in which case the alkyd is manufactured in a similar way to that used when manufacturing terephthalic acid alkyd according to Example 8.

All the described iso- and terephthalic acid alkyds are soft in cured state and have good electrical properties and good durability. Insulated conductor bundles may be manufactured in the same way and under the same conditions as in Examples 1–9 with the use of an epoxy resin, for example consisting of 85 parts "Araldite F," 100 parts "Curing agent 905" (both from Ciba A.G., Switzerland) and 15 parts phenyl glycidylether instead of the impregnant in the examples consisting of an unsaturated polyester resin. Drying and impregnation of the winding may then take place under a pressure of about 0.1 mm. Hg. When the impregnant has been supplied a pressure of about 25 kp./cm.² is applied. Curing takes place at approximately 160° C. for 4 to 6 hours.

It is obvious that backings other than glass cloth tapes may be used in the insulated tape, inter alia tapes or cloths of other fibrous material such as asbestos, cotton, silk, and paper.

On dense backing such as paper, the varnish should be applied on one side only before being brought into contact with the mica flake layer. The varnish may also be applied on one side of the mica flake layer, after which the backing is brought into contact with the varnished mica flake layer.

The thickness of the insulated tape, as well as the thicknesses of its components, may be varied. The number of layers of insulated tape in a conductor insulation may of course also be varied according to the construction of the insulated tape and the required electrical strength of the insulation.

Obviously the width of the insulating material may also be varied. It may for example be so wide that it should be characterised as a sheet. Insulating material having a width corresponding to the length of the straight groove parts of the high voltage coils may thus with advantage be used for insulating these groove parts by being wound around the groove part in several layers situated one above the other.

Besides the described completely polymerisable impregnants may be used several other commercially available unsaturated polyester resins and epoxy resins as well as other completely polymerisable resins. Although many unsaturated polyester resins and epoxy resins suitable for impregnating electrical insulations are known, a few additional examples will be mentioned. Thus, for example, an impregnant consisting of 60 parts by weight of a reaction product of 3 moles maleic acid anhydride, 1 mole adipic acid, 4.4 moles ethylene glycol manufactured according to the earlier described process with an acid number of 30, and of 40 parts by weight diallylphthalate, and containing 0.75% benzoyl peroxide may be used, as well as, for example, an impregnant consisting of 70 parts of a reaction product of 1 mole fumaric acid, 1 mole phthalic acid and 2.2 moles propylene glycol reacted to an acid number of 25, and of 30 parts monostyrene and containing 0.5% benzoyl peroxide. Amongst suitable epoxy resins may be mentioned a product consisting of 100 parts "Epon 828" (Shell Chemical Co.) and 65 parts hexahydrophthalic acid anhydride, further a product consisting of 100 parts "Dow 331" (Dow Chemical Co.) and 65 parts tetrahydrophthalic acid anhydride.

Of course the conductor to be insulated need not, as is the case in accordance with FIGURE 2, be composed of a bundle of several individual conductors but may equally well consist of a single conductor.

What is claimed is:

1. Method of manufacturing an insulated electric conductor, particularly a high voltage coil, the insulation comprising a bandage of an insulating material wound around the conductor in several layers, the bandage being impregnated with a resin, said insulating material comprising a self-carrying layer of small mica flakes overlapping each other, a backing for the mica flake layer and a binder which binds the mica flake layer to the backing, the steps comprising manufacturing the insulation material by binding the mica flake layer to the backing with a binder comprising a thermosetting alkyl resin built up of an acid selected from the group consisting of isophthalic and terephthalic acids and mixtures thereof, the average molecular weight of said alkyd resin being so high when it is brought into contact with the mica flake layer that a 50% by weight solution of the alkyd resin in a mixture of 10 parts by weight toluene and 3 parts by weight n-butanol has a viscosity at 23° C. of at least 250 centipoise.

2. Method as claimed in claim 1 in which the alkyd resin is transferred to cured state before the insulating material is applied around the conductor.

3. Method as claimed in claim 1, in which the binder comprises a reaction product of an acid component selected from the group consisting of isophthalic acid and terephthalic acid, mixtures of said acids and lower alkyl esters of said acids, at least one aliphatic dicarboxylic acid having at least six carbon atoms, at least one dihydric alcohol and at least one polyhydric alcohol containing at least three hydroxyl groups and in which the ratio between the number of hydroxyl groups and the number of carboxylic groups in the starting mixture of alcohols and acids is at least 1.1 and at the most 1.7.

4. Method as claimed in claim 3, in which the ratio between the weight of on the one hand the acid selected from the group of isophthalic acid and terephthalic acid and on the other hand the weight of the aliphatic dicarboxylic acid is at the most 5 and at the least 0.5.

5. Method according to claim 3, in which the aliphatic dicarboxylic acid comprises an acid selected from the group consisting of adipic and sebacic acid.

6. Method according to claim 3, in which the dihydric alcohol comprises an alcohol selected from the group consisting of ethylene glycol, propylene glycol and butylene glycol.

7. Method according to claim 3, in which the polyhydric alcohol containing at least three hydroxyl groups comprises an alcohol selected from the group consisting of glycerol, pentaerythritol and trimethylolpropane.

References Cited

UNITED STATES PATENTS

| | | | |
|---|---|---|---|
| 2,479,357 | 8/1949 | Hill et al. | 156—190 X |
| 2,656,290 | 10/1953 | Berberich et al. | 156—185 |
| 2,757,298 | 7/1956 | Botts et al. | 156—188 X |
| 2,772,696 | 12/1956 | Schneider et al. | 156—190 X |
| 2,821,498 | 1/1958 | Botts | 156—53 |
| 2,917,420 | 12/1959 | Foster et al. | 156—53 |

HAROLD ANSHER, Primary Examiner

T. R. SAVOIE, Assistant Examiner

U.S. Cl. X.R.

156—56, 190; 161—171; 174—120